United States Patent
Mitsuoka et al.

(10) Patent No.: US 8,840,178 B2
(45) Date of Patent: Sep. 23, 2014

(54) SEATBACK FOR VEHICLE SEAT

(75) Inventors: Naoki Mitsuoka, Miyoshi (JP); Kazuhiro Tawada, Nisshin (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 258 days.

(21) Appl. No.: 13/286,500

(22) Filed: Nov. 1, 2011

(65) Prior Publication Data

US 2012/0112513 A1 May 10, 2012

(30) Foreign Application Priority Data

Nov. 5, 2010 (JP) ................. 2010-248417

(51) Int. Cl.
| | |
|---|---|
| B60N 2/68 | (2006.01) |
| B60N 2/42 | (2006.01) |
| B60N 2/70 | (2006.01) |
| B60N 2/20 | (2006.01) |
| B60N 2/22 | (2006.01) |

(52) U.S. Cl.
CPC ............... *B60N 2/20* (2013.01); *B60N 2/4221* (2013.01); *B60N 2/70* (2013.01); *B60N 2205/50* (2013.01); *B60N 2/22* (2013.01)
USPC ............... 297/216.13; 297/216.14; 297/463.2

(58) Field of Classification Search
USPC ............... 297/354.12, 216.14, 216.13, 463.2; 285/53, 115
See application file for complete search history.

(56) References Cited

U.S. PATENT DOCUMENTS

| | | | | |
|---|---|---|---|---|
| 4,789,204 A | * | 12/1988 | Kanazawa | 297/354.12 |
| 4,909,572 A | * | 3/1990 | Kanai | 297/452.38 |
| 5,938,265 A | | 8/1999 | Oyabu et al. | |
| 7,699,397 B2 | | 4/2010 | Andou et al. | |
| 8,424,968 B2 | * | 4/2013 | Humer et al. | 297/301.3 |

FOREIGN PATENT DOCUMENTS

| | | | | |
|---|---|---|---|---|
| JP | 04-43141 | | 4/1992 | |
| JP | 09-207639 | | 8/1997 | |
| JP | 2006347436 A | * | 12/2006 | |
| WO | 2007/026571 | | 3/2007 | |
| WO | WO 2010024395 A1 | * | 3/2010 | B60N 2/42 |

OTHER PUBLICATIONS

Japanese Office action having mail date of May 7, 2014, along with English-language translation thereof.

* cited by examiner

*Primary Examiner* — David R Dunn
*Assistant Examiner* — Tania Abraham
(74) *Attorney, Agent, or Firm* — Greenblum & Bernstein, P.L.C.

(57) ABSTRACT

A seatback for a vehicle seat, the seatback including: a frame to which a pad is mounted, the frame including, a pair of side frames extending along respective side parts of the seatback, and an extension bar extending between the side frames; and a cover that is rotatably attached to the extension bar along an outer surface of the extension bar.

10 Claims, 5 Drawing Sheets

SEATBACK FOR VEHICLE SEAT

CROSS-REFERENCE TO RELATED APPLICATIONS

This application claims priority from Japanese Patent Application No. 2010-248417 filed on Nov. 5, 2010, the entire contents of which are incorporated herein by reference.

TECHNICAL FIELD

Aspects of the invention relate to a seatback for a vehicle seat, which is mounted to a vehicle such as an automobile.

BACKGROUND

A related-art vehicle seat includes a seat cushion and a seatback. The seatback has a frame to which a pad is mounted. A lower left part and a lower right part of the frame are respectively connected by reclining apparatuses so that angles thereof with respect to the seat cushion can be adjusted. A connection bar that connects and synchronizes the reclining apparatuses is provided between the reclining apparatuses. The connection bar is provided with a bending mechanism capable of bending the connection bar to suppress the connection bar from being rotated when amounts of deformation at left and right side parts of the seatback, which is caused due to external force applied to the seatback, are different. Accordingly, it is possible to suppress the reclining apparatuses from being unexpectedly released due to the rotation of the connection bar.

However, the bending mechanism has a complicated structure. Accordingly, there are needs for a seatback having a simple structure in which a frame is hardly deformed or rotated by an external force applied to the seatback.

SUMMARY

According to an aspect of the invention, there is provided a seatback for a vehicle seat, the seatback including: a frame to which a pad is mounted, the frame including, a pair of side frames extending along respective side parts of the seatback, and an extension bar extending between the side frames; and a cover that is rotatably attached to the extension bar along an outer surface of the extension bar.

Accordingly, when an external force is applied to the seat cover, the cover is rotated along the outer surface of the extension bar by the external force. Therefore, the external force to be applied to the extension bar can be dispersed. For example, the external force can be dispersed in an upward or downward direction of the extension bar. Thereby, it is possible to suppress deformation or unexpected rotation of the extension bar by the cover having a simple structure.

DETAILED DESCRIPTION

Figure 1:
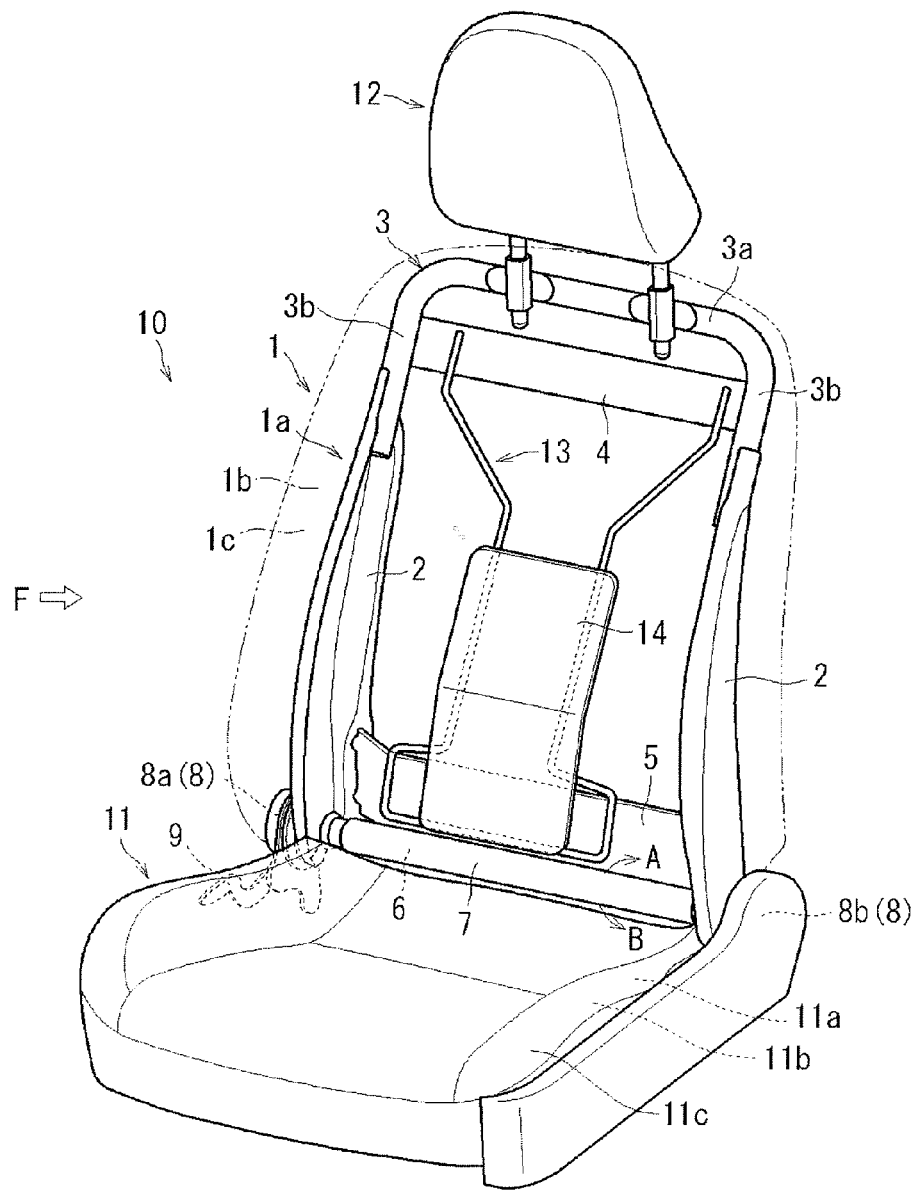
FIG. 1 is a perspective view of a vehicle seat.

An illustrative embodiment of the invention will be described with reference to FIGS. 1 to 6. A vehicle seat 10 has a seatback 1 and a seat cushion 11 and is mounted to a vehicle such as an automobile. The seatback 1 and the seat cushion 11 have frames 1a, 11a, pads 1b, 11b which are mounted to the frames 1a, 11a and covering members 1c, 11c which covers the pads 1b, 11b.

As shown in FIG. 1, the frame 1a of the seatback 1 has side frames 2 and an extension bar 6. The side frames 2 are made of metal plates and extend along respective side parts of the seatback 1. The side frames 2 are connected at upper parts thereof by an upper frame 3 made of a metal pipe.

As shown in FIG. 1, the upper frame 3 integrally has a width extension part 3a extending in a width direction and a pair of longitudinal parts 3b extending downwards from both end portions of the width extension part 3a. A head rest 12 is attached to the width extension part 3a. An upper reinforcement member 4 extending in the width direction is attached to the longitudinal parts 3b.

As shown in FIG. 1, a lower reinforcement member 5 extending in the width direction is attached between lower parts of the side frames 2. An elastically deformable rod 13 made of metal is attached between the upper reinforcement member 4 and the lower reinforcement member 5. An upper part of the rod 13 is attached to the upper reinforcement member 4 and a lower part of the rod 13 is attached to the lower reinforcement member 5. A support member 14 is attached to the rod 13. The support member 14 is provided at a position corresponding to a waist of a user. The pad 1b that is provided at a front side of the rod 13 is elastically supported at the back side thereof by the rod 13.

Figure 2:
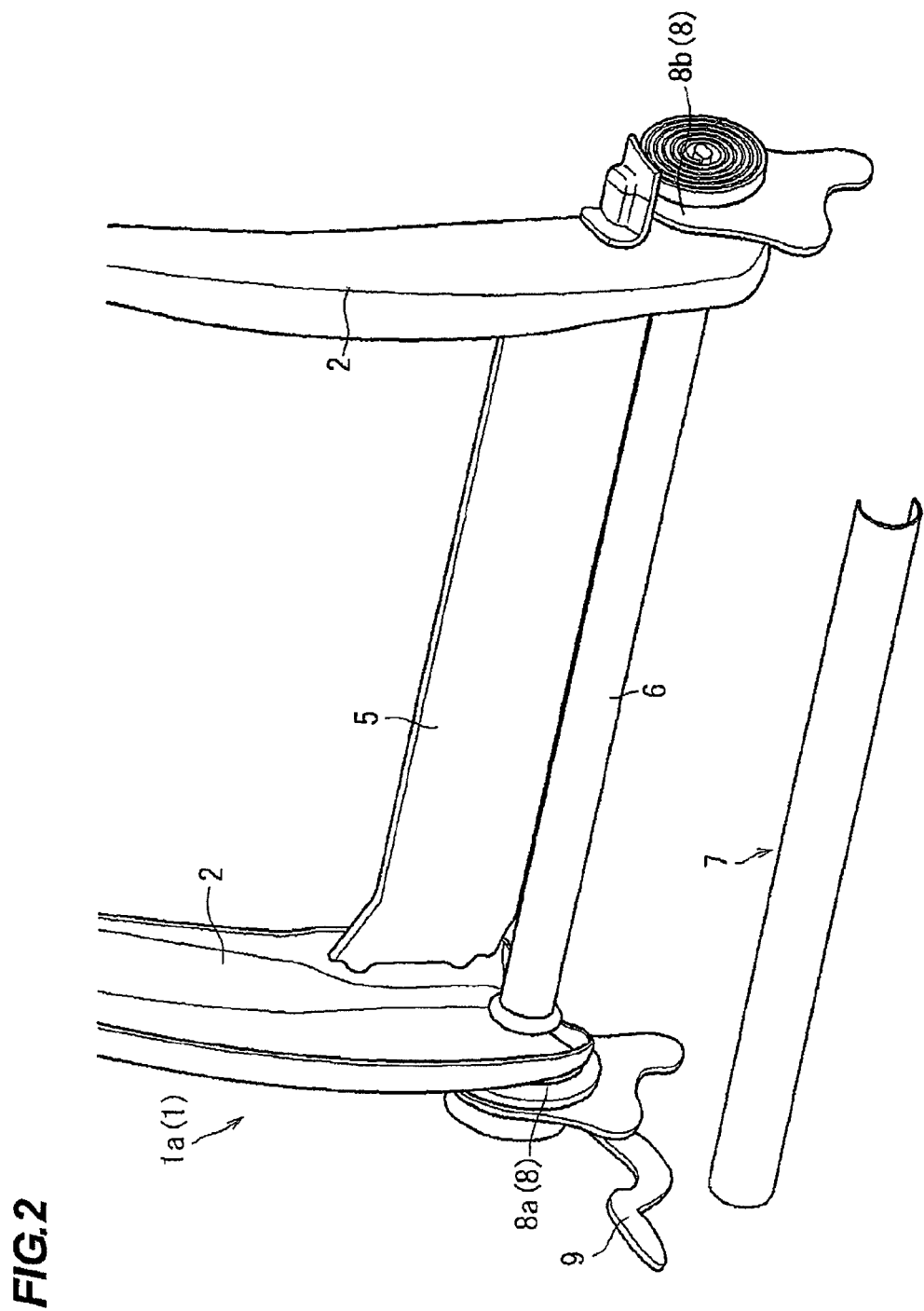
FIG. 2 is an exploded perspective view of a part of a seatback.

As shown in FIGS. 1 and 2, the extension bar (connection rod) 6 is a metal pipe and a cross-section shape thereof is circular. The extension bar 6 extends in the width direction between the lower parts of the side frames 2. Each end portions of the extension bar 6 is connected to reclining apparatuses 8 provided to the side frames 2.

As shown in FIGS. 1 and 2, a first reclining apparatus 8a is provided at one side part of the seatback 1 and a second reclining apparatus 8b is provided at another side part of the seatback 1. The first and second reclining apparatuses 8a, 8b are connected so that they can be switched between an unlock state at which the frames 1a, 1b can be rotated and a lock state at which the frames cannot be rotated.

As shown in FIGS. 1 and 2, the first reclining apparatus 8a is switched from the lock state to the unlock state by operating a release lever 9 connected to the reclining apparatus 8a. The first and second reclining apparatuses 8a, 8b are connected by the extension bar 6 so that they can be synchronized. Accordingly, when the release lever 9 is operated, the extension bar 6 is axially rotated via the first reclining apparatus 8a, so that the second reclining apparatus 8b is switched from the lock state to the unlock state.

Thereby, the seatback 1 can be rotated with respect to the seat cushion 11, so that an angle of the seatback 1 can be adjusted with respect to the seat cushion 11. After the angle adjustment, when the operation of the release lever 9 is released, the reclining apparatuses 8a, 8b are switched from the unlock state to the lock state. As a result, the seatback 1 cannot be rotated with respect to the seat cushion 11, so that the seatback 1 is kept at a predetermined angle with respect to the seat cushion 11.

As shown in FIG. 2, a cover 7 is mounted on an outer surface of the extension bar 6. The cover 7 is formed of a resin, for example fluorine resin having low frictional resistance such as polytetrafluoroethylene. A length of the cover 7 is substantially the same as a length of the extension bar 6, and in fact, is slightly shorter than the length of the extension bar 6 so as to be able to be attached to the extension bar 6.

Figure 3:
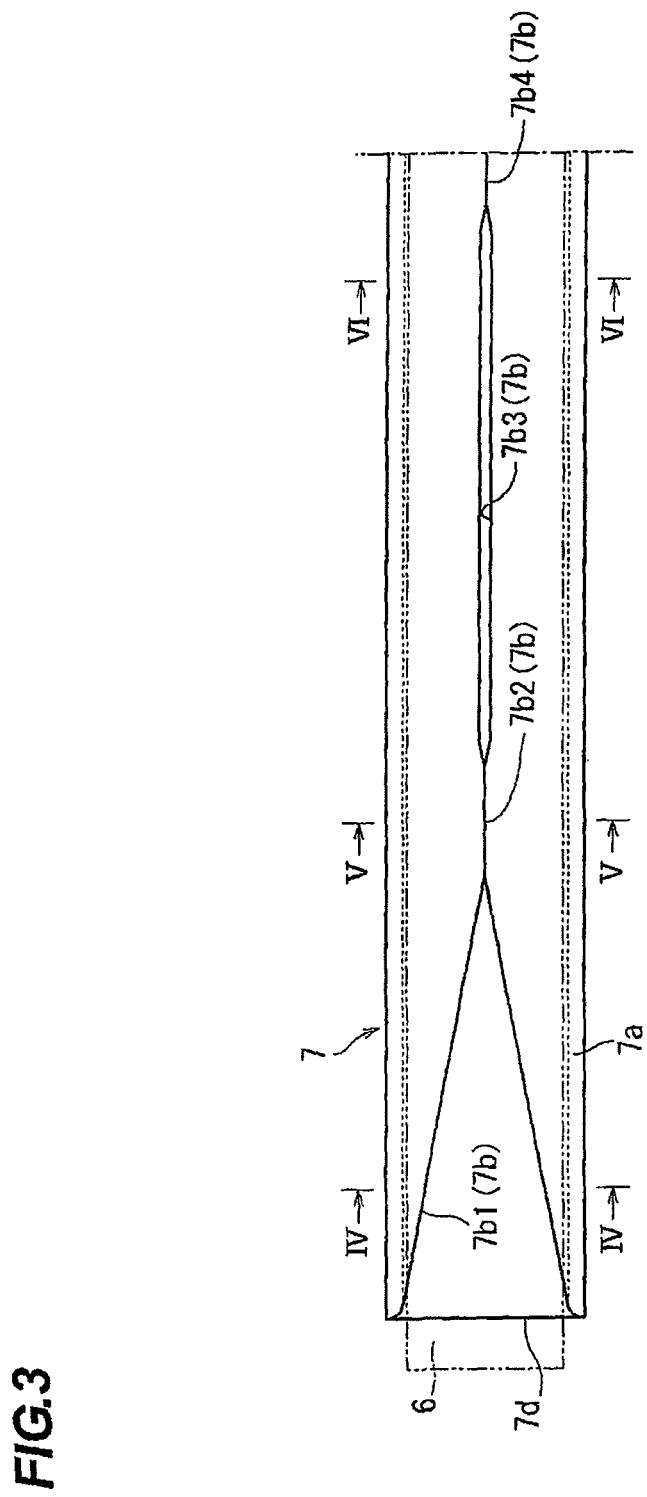
FIG. 3 is a partial rear view of a cover.

The cross-section shape of the cover 7 is a substantially C-shape and is formed with an opening 7b, as shown in FIG. 3. The opening 7b opens an outer periphery of the cover 7 and is formed over an entire length of the cover 7 in a longitudinal direction thereof. The opening 7b is bilaterally symmetric and has a side opening portion 7b1, a side contact portion 7b2, a central opening portion 7b3 and a central contact portion 7b4.

Figure 4:
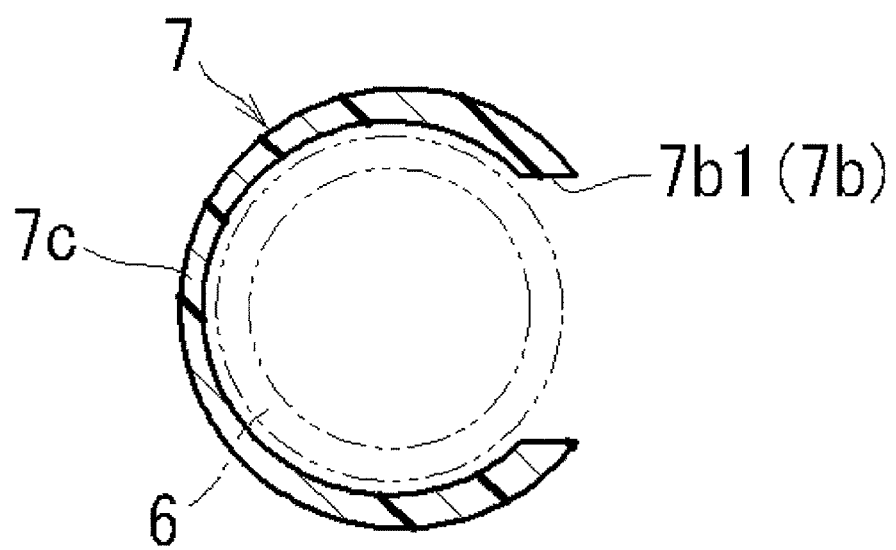
FIG. 4 is a sectional view taken along a line IV-IV of FIG. 3.
Figure 5:
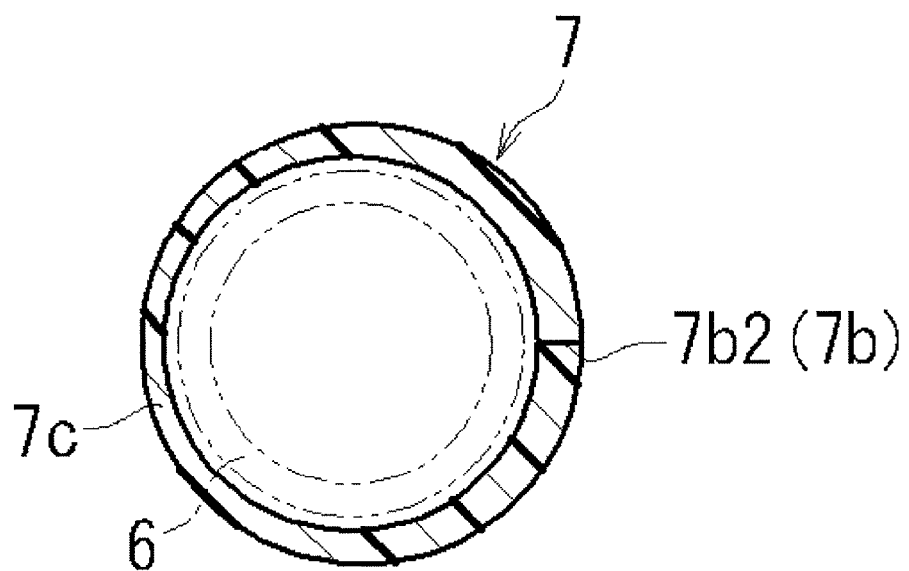
FIG. 5 is a sectional view taken along a line V-V of FIG. 3.

As shown in FIGS. 3 and 4, the side opening portion 7b1 is provided at an end part 7a of the cover 7 in the longitudinal direction. An opening width of the side opening portion 7b1 is largest at an end edge 7d of the cover 7 in the longitudinal direction and is gradually decreased toward the side contact portion 7b2. As shown in FIGS. 3 and 5, the side contact portion 7b2 is adjacent to the side opening portion 7b1. An opening width of the side contact portion 7b2 is smaller than that of the side opening portion 7b1. The opening width of the side contact portion 7b2 is preferably zero, such that both end portions of the cover 7 in a circumferential direction are contacted at the side contact portion.

Figure 6:
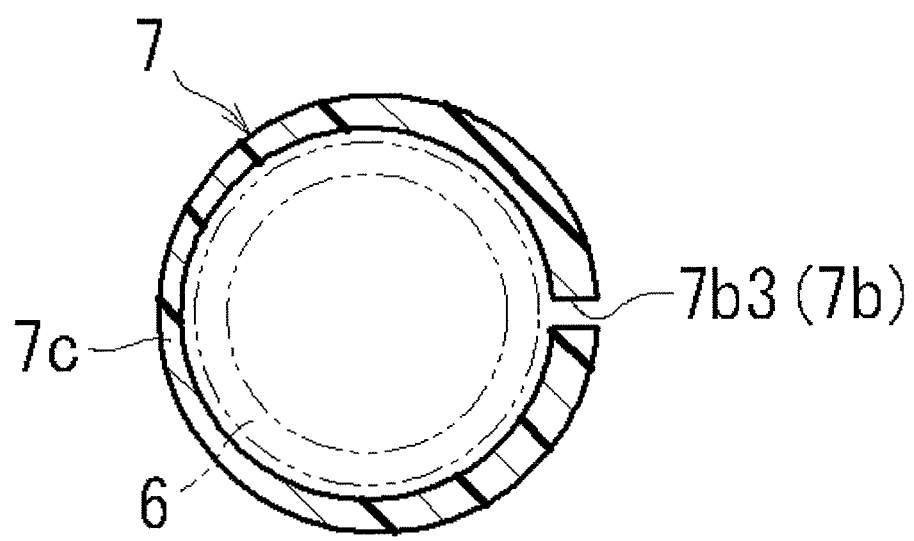
FIG. 6 is a sectional view taken along a line VI-VI of FIG. 3.

As shown in FIG. 3, the central contact portion 7b4 is positioned at a central part of the cover 7 in the longitudinal direction. An opening width of the central contact portion 7b4 is smaller than that of the side opening portion 7b 1. The opening width of the central contact portion 7b4 is preferably zero, such that both end portions of the cover 7 in the circumferential direction are contacted at the central contact portion. As shown in FIGS. 3 and 6, the central opening portion 7b3 is positioned between the side contact portion 7b2 and the central contact portion 7b4. An opening width of the central opening portion 7b3 is larger than that of the side contact portion 7b2 and that of the central contact portion 7b4.

As shown in FIGS. 4 to 6, the cover 7 has a thin portion 7c at a part thereof in the circumferential direction. The thin portion 7c is formed in an area of the cover opposed to the opening portion 7b and is formed over the entire length of the cover 7 in the longitudinal direction. The thin portion 7c is thinner than an area of the cover adjacent to the opening 7b so that it can be easily deformed compared to other areas of the cover. Accordingly, when a force is applied to the cover 7 in a direction of expanding the opening 7b, the cover is elastically deformed mainly at the thin portion 7c.

When attaching the cover 7 to the extension bar 6, the extension bar 6 is inserted into the cover 7 through the side opening portion 7b1, as shown in FIG. 3. The end edge of the side opening portion 7b1 is pushed by the extension bar 6, so that the opening 7b of the cover 7 is enlarged. Thereby, the extension bar 6 can be inserted into the cover 7 in a radial direction.

As shown in FIG. 1, when an impact is applied to the vehicle, an external force F may be applied to the seatback 1. For example, a weight of a user is applied, as the external force F, to the seatback 1 from the front, by an inertial force. The external force F is transmitted to the cover 7 via the pad 1b. The cover 7 is rotated about the extension bar 6, in a direction shown by arrow A or arrow B in FIG. 1, by the external force F.

By cover 7 rotating with respect to the extension bar 6, the force to be applied to the extension bar 6 can be dispersed in the upward or downward direction of the extension bar 6. Thereby, the force to be applied to the extension bar 6 is decreased, so that a deformation amount of the extension bar 6 or a rotating amount of the extension bar 6 is reduced. Thereby, it is possible to suppress the reclining apparatuses 8 from being unexpectedly switched from the lock state to the unlock state due to the extension bar 6.

As described above, the seatback 1 has the frame 1a to which the pad 1b is mounted, as shown in FIG. 1. The frame 1a has the pair of side frames 2 extending along the respective side parts of the seatback 1 and the extension bar 6 extending between the side frames 2. Further, the seatback 1 has the cover 7 that is rotatably attached to the extension bar 6 along the outer surface of the extension bar 6.

Accordingly, when the external force F is applied to the seatback 1, the cover 7 is rotated along the outer surface of the extension bar 6 by the external force F. Therefore, the external force to be applied to the extension bar 6 can be dispersed by the rotation of the cover 7. For example, the external force can be dispersed in the upward or downward direction of the extension bar 6. Thereby, it is possible to suppress the deformation or unexpected rotation of the extension bar 6 by the cover 7 having the simple structure.

As shown in FIG. 3, the cover 7 is formed with the opening 7b, which can be elastically expanded to receive the extension bar 6 from the radial direction, over an entire length thereof in the longitudinal direction thereof. The opening 7b has the side opening portion 7b1 at the end part of the cover 7 in the longitudinal direction, whose opening width gradually increases toward the end edge 7d of the cover 7 in the longitudinal direction. Accordingly, when inserting the extension bar 6 into the cover 7 through the side opening portion 7b1, the opening 7b can be gradually expanded by the extension bar 6. Thereby, the extension bar 6 can be easily inserted into the cover 7.

As shown in FIG. 4, for example, the cover 7 has the thin portion 7c, which is thinner than an area of the cover 7 adjacent to the opening 7b, in the area of the cover opposed to the opening 7b in the radial direction. Therefore, the cover 7 can be elastically deformed mainly at the thin portion 7c when the extension bar 6 is received therein through the opening 7b. Thereby, the opening width of the opening 7b increases, so that the extension bar 7 can be inserted through the opening 7b.

As shown in FIG. 3, the opening 7b has the side contact portion 7b2 and the central opening portion 7b3. The side contact portion 7b2 is adjacent to the side opening portion 7b1 and allows both end portions of the cover 7 in the circumferential direction to contact each other. The central opening portion 7b3 is adjacent to the side contact portion 7b2 and has the opening width larger than that of the side contact portion 7b2.

Accordingly, since the central opening portion 7b3 has the opening width larger than that of the side contact portion 7b2, both end portions of the cover 7 in the circumferential direction can securely contact each other at the side contact portion 7b2. Thereby, the opening width becomes zero at the side contact portion 7b2, so that it is possible to strongly restrain the extension bar 6 from falling out from the cover 7 at the side contact portion 7b2. In particular, the extension bar 6 is suppressed from falling out from the side opening portion 7b1 adjacent to the side contact portion 7b2.

The invention is not limited to the above illustrative embodiment and can be modified as follows. For example, the extension bar 6 shown in FIG. 1 may extend between the side frames 2 and the respective end parts of the extension bar 6 may be fixed to the side frames 2. Although the extension bar 6 is provided at the lower parts of the side frames 2 in the above-described illustrative embodiment, the extension bar may be provided at the upper parts or central parts of the side frames. Although the cross-section shape of the extension bar is circular in the above illustrative embodiment, the cross-section shape of the extension bar 6 may also be polygonal. At this time, the opening 7b of the cover 7 may receive the extension bar 6 from a direction perpendicular to the outer surface of the extension bar 6.

Although the cover 7 has the substantially same length as the entire length of the extension bar 6 in the longitudinal direction in the above-described illustrative embodiment, the cover may have a length that covers only a part of the extension bar 6 in the longitudinal direction. Further, although only one cover 7 is attached to the extension bar 6 in the above-described illustrative embodiment, a plurality of covers having a short length may be attached to the extension bar 6.

The cover 7 may be attached to the extension bar 6 by receiving the extension bar 6 in an axial direction from one longitudinal end part of the extension bar 6. At this time, the cross-section shape of the cover 7 may be circular without the opening 7b. The cover 7 may have a plurality of partition bodies, which are mounted to the extension bar 6 from an outer side in the radial, and the partition bodies may be assembled to each other, so that the cover 7 is rotatably attached to the outer surface of the extension bar 6.

The seat may also be mounted to a ship, an airplane, etc.

What is claimed is:

1. A seatback for a vehicle seat, the seatback comprising:
a frame to which a pad is mounted, the frame including:
   a pair of side frames extending along respective side parts of the seatback; and
   an extension bar extending between the side frames; and
a cover that is rotatably attached to the extension bar along an outer surface of the extension bar,
wherein the cover includes an opening provided in a longitudinal direction of the cover over an entire length of the cover and that can be elastically expanded to receive the extension bar from a radial direction, and
wherein the opening includes a side opening portion at an end part of the cover in the longitudinal direction, and an opening width of the side opening portion gradually increases toward an end edge of the cover in the longitudinal direction.

2. The seatback for a vehicle according to claim 1,
wherein the opening further includes a side contact portion that is adjacent to the side opening portion and a central opening portion that is adjacent to the side contact portion,
wherein an opening width of the central opening portion is larger than an opening width of the side contact portion.

3. The seatback for a vehicle seat according to claim 1,
wherein the cover includes a thin portion that is provided to an area of the cover opposed to the opening in the radial direction and is thinner than an area of the cover adjacent to the opening.

4. The seatback for a vehicle according to claim 1,
wherein reclining apparatuses are provided at each sides of the extension bar.

5. The seatback for a vehicle according to claim 1,
wherein the extension bar extends between a lower power part of the side frames.

6. The seatback for a vehicle according to claim 1,
wherein a cross-section shape of the extension bar is circular.

7. The seatback for a vehicle according to claim 1,
wherein a cross-section shape of the cover is generally C-shape.

8. The seatback for a vehicle seat according to claim 1,
wherein the cover has a thin portion in an area opposed to the opening in the radial direction, which is thinner than a thickness of an adjacent area of the opening.

9. A seatback for a vehicle seat, the seatback comprising:
a frame to which a pad is mounted, the frame including:
   a pair of side frames extending along respective side parts of the seatback; and
   an extension bar extending between the side frames; and
a cover that is rotatably attached to the extension bar along an outer surface of the extension bar,
wherein the cover includes an opening provided in a longitudinal direction of the cover over an entire length of the cover and that can be elastically expanded to receive the extension bar from a direction perpendicular to the outer surface of the extension bar, and
wherein the opening includes a side opening portion at an end part of the cover in the longitudinal direction, and an opening width of the side opening portion gradually increases toward an end edge of the cover in the longitudinal direction 10. The seatback for a vehicle seat according to claim 9,
wherein the cover has a thin portion in an area opposed to the opening in a radial direction, which is thinner than a thickness of an adjacent area of the opening.

* * * * *